(12) United States Patent
Su (10) Patent No.: US 7,949,035 B2
(45) Date of Patent: May 24, 2011

(54) GPS SIGNAL ACQUISITION SYSTEM AND METHOD

(75) Inventor: Fei Su, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1193 days.

(21) Appl. No.: 11/611,162

(22) Filed: Dec. 15, 2006

(65) Prior Publication Data

US 2007/0291824 A1    Dec. 20, 2007

(30) Foreign Application Priority Data

Jun. 16, 2006   (TW) ................................ 95121575 A (51) Int. Cl.
*H04B 1/00* (2006.01)
(52) U.S. Cl. ........ 375/147; 375/136; 375/150; 375/316; 375/324; 375/343; 455/436; 455/574
(58) Field of Classification Search .......... 375/135–136, 375/145–147, 150, 290, 292, 295, 297, 306, 375/316, 342–343, 242–244, 148, 299, 137, 375/259, 345, 346, 348, 350
See application file for complete search history.

(56) References Cited

U.S. PATENT DOCUMENTS

| | | | |
|---|---|---|---|
| 5,347,284 A | 9/1994 | Volpi | |
| 6,480,150 B2 * | 11/2002 | Falk et al. ................ | 342/357.77 |
| 6,772,065 B2 | 8/2004 | Sanmiya | |
| 6,995,694 B1 * | 2/2006 | He et al. ......................... | 341/58 |
| 7,313,421 B2 * | 12/2007 | Dejanovic et al. ............ | 455/574 |
| 7,486,749 B2 * | 2/2009 | Pietila et al. .................. | 375/343 |
| 2003/0231704 A1 * | 12/2003 | Tanaka et al. ................. | 375/150 |
| 2007/0019714 A1 * | 1/2007 | Bochkovskiy et al. ....... | 375/150 |
| 2007/0024499 A1 * | 2/2007 | Bochkovskiy et al. .. | 342/357.12 |
| 2007/0104299 A1 * | 5/2007 | Cahn et al. .................... | 375/345 |
| 2007/0268177 A1 * | 11/2007 | Ahmed et al. ........... | 342/357.02 |

FOREIGN PATENT DOCUMENTS

| | | |
|---|---|---|
| JP | 9-33631 A | 2/1997 |
| TW | 200506406 A | 2/2005 |
| TW | 200526926 A | 8/2005 |

OTHER PUBLICATIONS

"Adaptive Threshold Control Scheme for Packet Acquisition" Brigant et al., 1998, pp. 1580-1582.
"Block Acquisition of Weak GPS Signals in a Software Receiver" Psiaki, Sep. 2001, pp. 1-13.
"GPS Receiver Search Techniques" Ward, 1996, pp. 604-611.
"Modeling of Non-Coherent Sequential Acquisition Process for DS/SS Signals" Yan et al., Apr. 2002, pp. 13-19.
"Parallel Acquisition of PM Sequences in DS/SS Systems" Chawla et al., 1994, pp. 2155-2164.

(Continued)

*Primary Examiner* — Shuwang Liu
*Assistant Examiner* — Hirdepal Singh
(74) *Attorney, Agent, or Firm* — Thomas|Kayden (57) ABSTRACT

A Global Position System signal acquiring system and method is provided in this invention. Pluralities of counters are set, each corresponding to a code bin and a frequency bin of the signal. Subsequently, the signal corresponding to the counters is repeatedly received in a unit of time and the counters are accordingly updated for a pre-determined iteration. At last, a maximum value among the counters is found to acquire the signal corresponding to the counter having the maximum value.

12 Claims, 6 Drawing Sheets

OTHER PUBLICATIONS

"Real-Time Acquistion and Tracking for GPS Receivers" Alaqeeli, et al., 2003, pp. 500-503.

Brigant: "Adaptive Thershold Control Scheme for Packet Acquisition", IEEE Transactions on Communications, vol. 46, No. 12, Dec. 1998, 3 pages.

Psiaki: "Block Acquistion of Weak GPS Signals In A Software Receiver", Mark L. Psiaki, Cornell University, 13 pages, Sep. 2001.

Ward: "GPS Receiver Search Techniques", Phillip W. Ward, Navward GPS Consulting, 8 pages, IEEE 1996.

Yan: "Modeling of Non-Coherent Sequential Acquisition Process for DS/SS Signals", Li Yan et a., Communication Research Center, Harbin Institute of Technology, Harbin 150001, P.R. China, Received Apr. 5, 2002, 7 pages.

Chawla: "Parallel Acquisition of PN Sequences in DS/SS Systems", Kapil K. Chawla, IEEE Transactions on Communications, vol. 42, No. 5, May 1994, 10 pages.

Notice of Allowance TW Patent Application TW35121575 Issued on Jul. 21, 2008.

* cited by examiner

GPS SIGNAL ACQUISITION SYSTEM AND METHOD

BACKGROUND OF THE INVENTION

1. Field of the Invention

The invention relates to acquire GPS (global positioning system) signals, and in particular, to a GPS receiver and methods for searching and acquiring GPS signals.

2. Description of the Related Art

GPS (global positioning system) technology has been widely used in various devices such as navigation systems of a mobile telephone or a car, based on relative distance between the device and positioning satellites. Each satellite transmits its own CA code through the same RF carrier. The CA code and transmit frequency are known for receiver, but there is a relative speed between the satellite and receiver, the received signal is modulated by Doppler frequency, and there is a space distance between receiver and satellite, the transmit signal need little time to travel the distance and arrive the receiver, which result in a time delay in received signal. In order to obtain the distance and relative speed between the device and certain satellite, the device should recover the CA code of this satellite. If more than four satellites' CA codes are grasped, location and speed of the device can be determined.

If the receiver is static relative to a certain satellite, then the distance can be calculated just by the time delay of the CA code. Time delay can be calculated by measuring the phase shift of the received RA code. Do integrations between the received signal and local CA codes with cyclic shifts, the position of the max integration value represents the phase shift of the received signal.

Nevertheless, there is always a relative movement between the receiver and satellite, and Doppler effect produced, that means the received CA code is modulated by the Doppler and transmitting frequency. If the Doppler frequency is calculated, then the relative speed between receiver and satellite can be calculated.

The GPS receiver should recover the received CA code which is modulated by Doppler and phase shift, the search is two dimensions, one is frequency domain, and the other is time domain.

Figure 1:
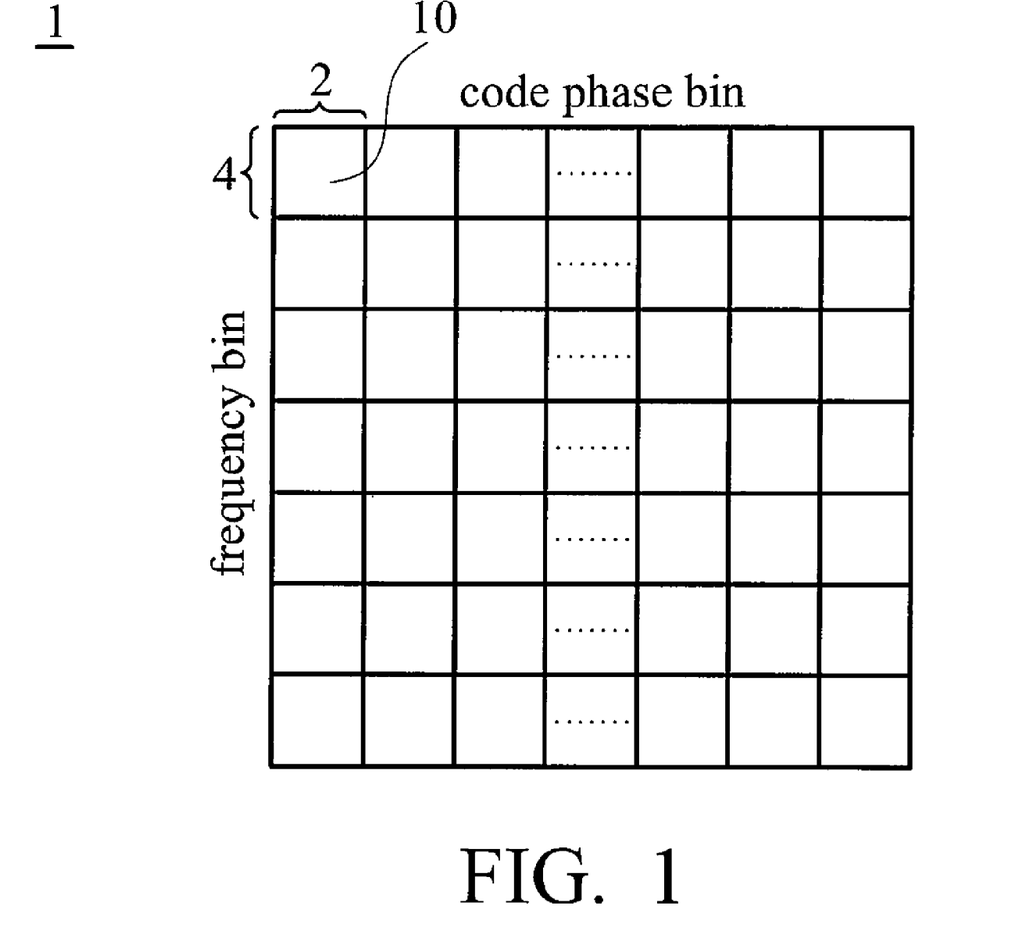
FIG. 1 is a schematic illustration showing an example of a searching space formed by code bins and frequency bins.

FIG. 1 shows an example of a search space formed by different code bins and frequency bins. As shown, the space can be referred to as a two dimensional matrix 1, in which each row corresponds to a code bin and each column to a frequency bin. Each cell 10 represents the combination of one code bin 2 and one frequency bin 4, namely, a set of a time delay and a frequency shift. All possible cells 10 are searched by a GPS receiver to locate a target cell through the frequency bin of which the specific code from a specific GPS satellite is received by the GSP receiver, with distance and relative speed between the GPS satellite and the GPS receiver then determinable according to the time delay and frequency shift expressed by the target cell.

In a conventional GPS receiver, the comparison of the correlation value for each cell 10 is performed cell by cell. The search speed is slow. Therefore there exists a need to improve the search speed.

BRIEF SUMMARY OF INVENTION

Accordingly, the invention provides GPS receivers and related signal acquisition methods with improved searching speed, such that target cell can be located quickly and easily.

The invention provides a method for locating a target cell among a plurality of cells corresponding to a GPS signal. The cells form a two-dimensional array, each row of which corresponds to a code bin of the signal and each column of which corresponds to a frequency bin of the signal. The method comprises providing a plurality of counters, each corresponding to one of the cells, receiving the GPS signal in a unit of time in a detecting frequency bin, decoding the received signal with at least one corresponding code bin with respect to a first cell of the cells to generate at least one decoding result, comparing the decoding result with a threshold to update a corresponding counter with respect to the first cell of the cells, repeatedly receiving the GPS signal, decoding the signal, and comparing the result for a predetermined iteration when the corresponding counter exceeds a limit value, determining whether receiving, decoding, and comparison have been performed for all of the cells, filtering counters to generate filtered results, locating a most likely cell having the maximum value among the filtered results, and setting the most likely cell as the target cell for acquisition of the GPS signal.

The invention provides another method for acquisition of a Global Position System signal. A plurality of counters are set, each of which corresponds to a code bin and a frequency bin of the GPS signal. Subsequent, signal corresponding to sought counters in a unit of time are repeatedly received and the sought counters are updated for a pre-determined iteration. A maximum value among the counters is found. Finally, the signal is acquired using the code bin and the frequency bin corresponding to the counter having the maximum value.

The invention also provides a GPS receiver for locating a target cell among a plurality of cells corresponding to a GPS signal. Pluralities of counters are provided, each corresponding to one of the cells. The cells form a two-dimensional array. Each row of the two-dimensional array corresponds to a code bin of the signal and each column of the two-dimensional array corresponds to a frequency bin of the signal. The GPS receiver comprises an antenna module, a signal decoding and processing module, a detector and a filter. The antenna module receives the signal of a satellite. The signal decoding and processing module decodes a received signal in a unit of time in a detecting frequency bin with a corresponding code bin with respect to one of the cells to generate a decoding result. The detector compares the decoding result with a threshold to update a corresponding counter with respect to the one of the cells. The filter filters the counters to find a most likely cell having the maximum value among the filtered counters and set the most likely cell to be the target cell. When the corresponding counter exceeds a limit value, the signal decoding and processing module and the detector repeatedly decode, compare and update the corresponding counter for a predetermined iteration.

BRIEF DESCRIPTION OF DRAWINGS

The invention can be more fully understood by reading the subsequent detailed description and examples with reference made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

The total number of cells to be searched and calculated depends on parameters of the environment. For example, if the frequency to be searched is ranged between +5 KHz and −5 KHz of the regular frequency bin of a specific GPS satellite with the search step 1 KHz, the signal sampling rate is 5 MHz, and the predetection integration time is 1 ms, 11 frequency bins and 5000 code bins will be searched, with a total of 55000 cells to be searched.

Figure 2:
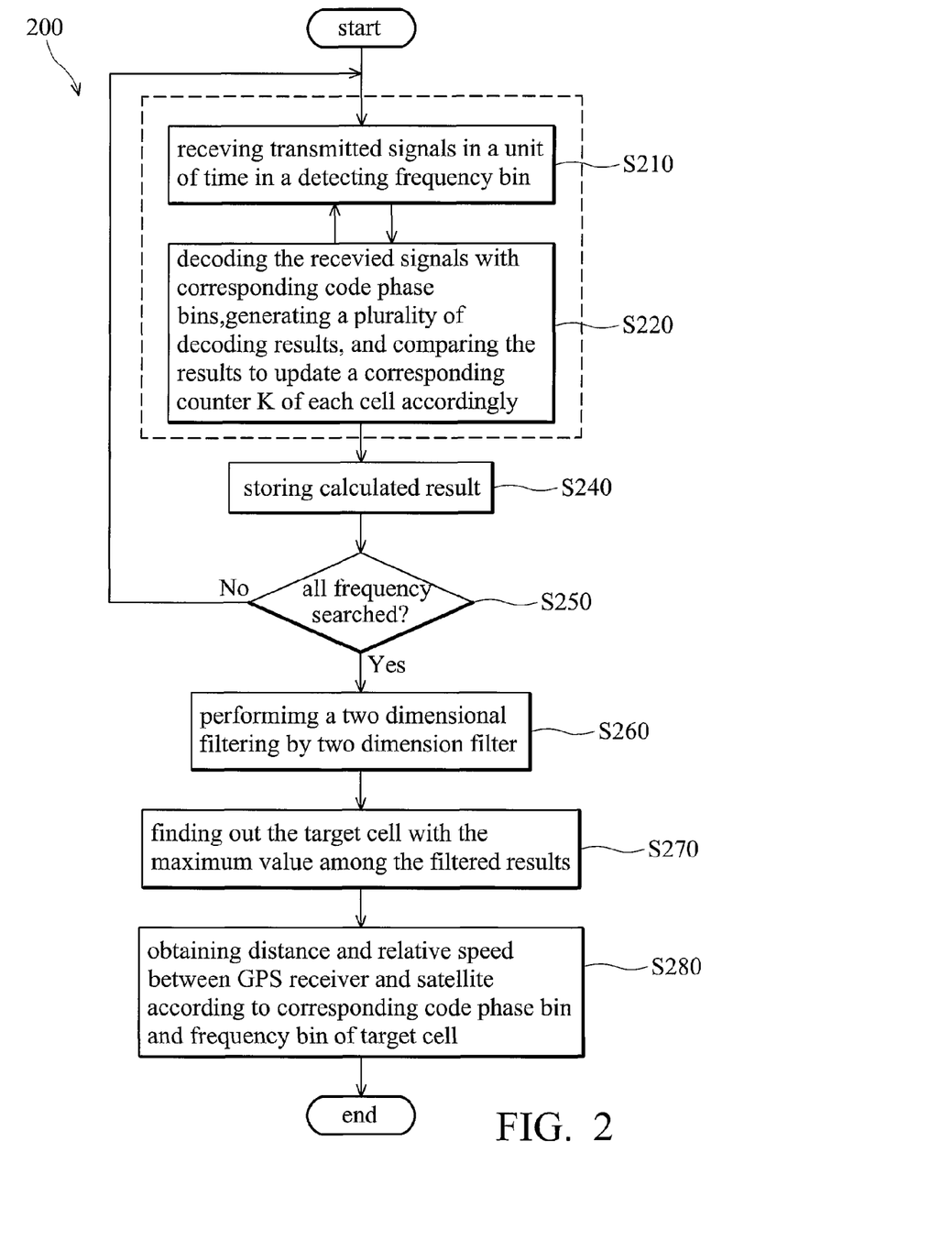
FIG. 2 is a flowchart of a search method according to an embodiment of the invention.

FIG. 2 is a flowchart of a search method according to an embodiment of the invention. Previously described parameters of the system are also applied here, that is, a total of 55000 cells 10 are to be searched. The disclosed search method can be used in a GPS receiver searching all possible cells to locate a target cell to determine the relative distance and speed between the GPS receiver and a specific GPS satellite. Cells 10 form a two dimensional matrix 1 having a plurality of code bins 2 and frequency bins 4 similar to the matrix 1 in FIG. 1.

In this embodiment, according to the search method of the invention, a plurality of counters K are provided, each representing a number stored in a specific position of a storage device, used as a decision condition. Each cell corresponds to one counter K. Each counter K can be set to an initial value, such as 1.

As shown in FIG. 2, in step S220, the GPS receiver receives a signal transmitted in a unit of time through one of the frequency bins to be searched. In step S220, the received signal is decoded with all code bins, each corresponding to a cell 10, by a FFT (fast fourier transformation) operation or a correlation operation for generating a plurality of decoding results. For example, if these decoding results form a decoding vector D showing that only 5 cells C0-C4 in a detecting frequency bin are searched, the decoding vector D may be expressed as (10, 20, 30, 20, 15), in which "10" represents a decoding result corresponding to the cell C0, "20" represents a decoding result corresponding to the cell C1, and so on. Then, for each decoding result, it is determined whether a predetermined condition is matched and whether a corresponding counter K requires updating. The decoding results (in the decoding vector) of the corresponding detecting frequency bin are read and compared to update the corresponding counters K of the cells in the detecting frequency bin. For example, the decoding result of each cell 10 in the decoding vector D is compared with a specific threshold Vt and the comparison result is utilized to update a corresponding counter K accordingly. For a standard GPS receiver, the unit of time is usually 1 millisecond (ms) or multiple thereof. Steps S210 and S220 are detailed later. In step S240, the calculated results from step S220, i.e. the corresponding counters K, are stored for further operation.

In step S250, it is determined whether all frequency bins to be searched have already been searched. If not (No in step S250), at least one of the frequency bins is still to be searched, such that step S210 is again performed to receive a signal in a unit of time from an unsearched frequency bin and the steps S210-S240 are also repeated to decode, compare and update corresponding counters K. If so (Yes in step S250), all counters K, regarded as a two-dimensional counter matrix, are filtered by performing two-dimensional filtering in step S260. The two-dimensional filtering can locate a target area with larger counters K in the counter matrix. The larger counters K in the counter matrix mean that, possibly, one of the corresponding cells therein is the target cell. In this embodiment, the filter may be a five-order FIR (finite impulse response) filter. For example, the counter matrix can be filtered by the FIR filter, such that only the counters exceeding a predetermined value will be left in the counter matrix. In step S270, a most likely cell having the maximum value in the filtered counter matrix is then retrieved. The most likely cell is defined to be the target cell. Finally, in step S280, the code bin and the frequency bin corresponding to the target cell are utilized to determine the relative position and speed of the GPS receiver regarding the GPS satellite.

It is understood that if signal strength of the localization signal is too weak or the relative distance between the GPS receiver and a satellite is too great, all of the counters K in the counter matrix may be too small, such that all counters are filtered out. In this case, the localization signal of the specific GPS satellite is too weak such that it can not be received or recognized by the GPS receiver. Thus, the search steps for the GPS satellite are stopped and those for another GPS satellite performed instead. In addition, step S220 may be performed to generate the counter values of cells sequentially or simultaneously. For example, cells in the two-dimensional matrix may be decoded one by one, or, to speed up the search speed, all the cells in the same frequency bin can be decoded at the same time.

In addition, the comparison in step S220 can be performed by a comparator that compares the decoding result of a cell with threshold Vt such that a corresponding counter K of the cell is updated accordingly.

Figure 3:
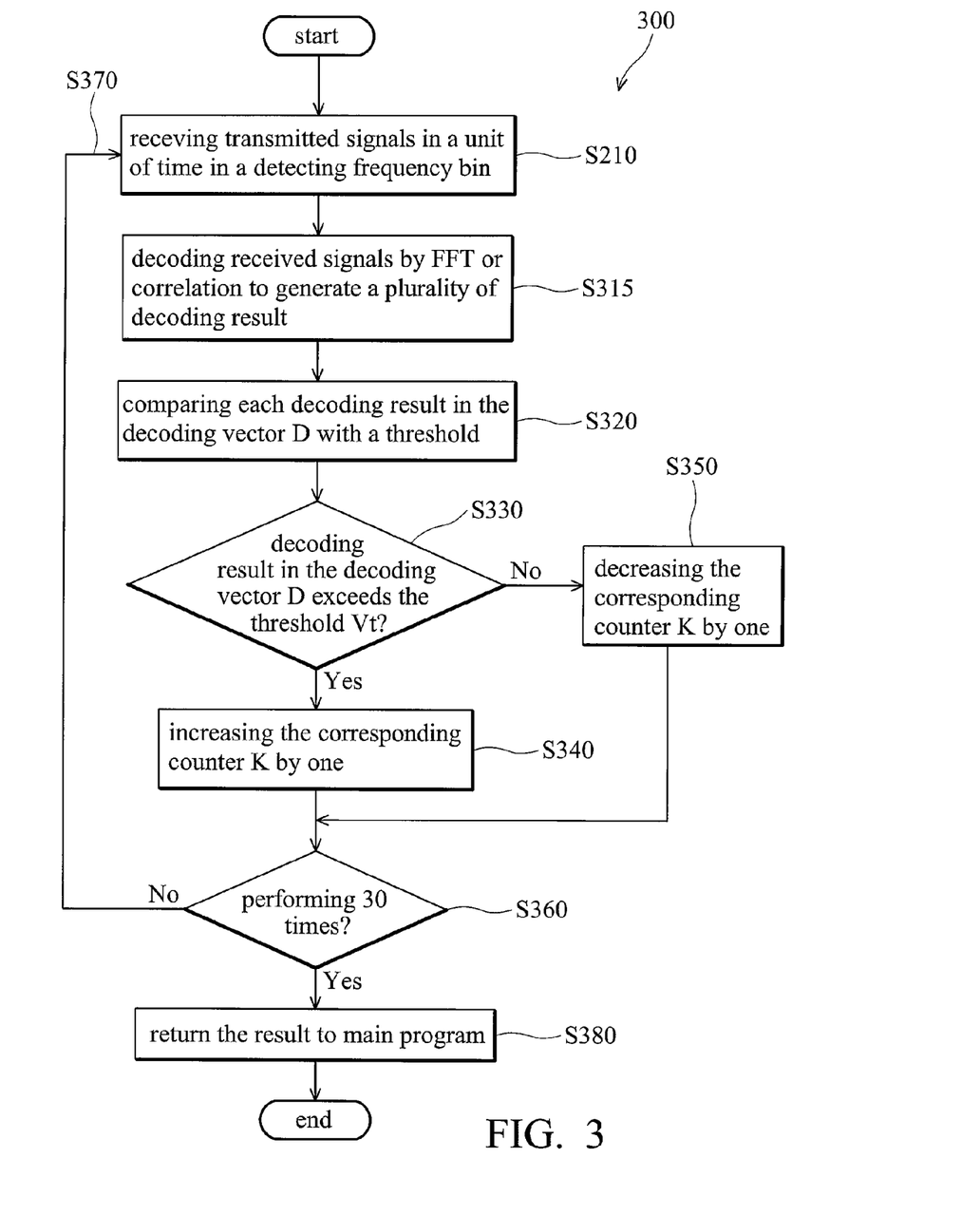
FIG. 3 is a flowchart for steps S210 and S220 of FIG. 2.

FIG. 3 is a flowchart of steps S210 and S220 in FIG. 2, performed with respect to a single frequency bin. As mentioned, in step S210, a GPS receiver receives the signal transmitted in a unit of time in a frequency bin. In step S315, the received signal is decoded with respect to corresponding code bins of the cells in the frequency bin using a FFT operation and/or a correlation operation, such that decoding results are generated. These decoding results form a decoding vector D. As shown in Step S320, each decoding result in the decoding vector D is compared with a threshold Vt. In step S330, it is determined whether a decoding result in the decoding vector D exceeds or equals the threshold Vt. If a decoding result in the decoding vector D exceeds or equals the threshold Vt, a corresponding counter K is increased by one, as shown in step S340. Alternatively, if a decoding result in the decoding vector D is less than the threshold Vt, as shown in step S350, a corresponding counter K is decreased by one. For example, it is assumed that only 5 cells C0-C4 are to be searched in a detecting frequency bin, the decoding vector D is (10,20,30, 20,15), and the threshold Vt is 20. At this time, each counter K initially is 1, and all of the counters regarding cells C0-C4 can be referred to as a counter vector P(1,1,1,1,1). Because the values of 20 and 30 exceed or equal threshold Vt, the corresponding counters in the counter vector P are increased by one. Because 10 and 15 are smaller than threshold Vt, the corresponding counters in the counter vector P are decreased by one. Therefore, after steps S330 and S340 or S350 are performed, the counter vector P turns out to be (0,2,2,2,0). It is understood that the threshold Vt is adjustable based on the parameters of the environment such that the best performance can be achieved.

Subsequent, it is determined whether the above steps have already been performed for a predetermined iteration, such as, for example, 30 times, as shown in step S360. If not, as directed by step S370, step S210 is again performed to receive the signal in a subsequent unit of time to compare and decode again. The steps S315-S360 are repeated to update the corresponding counters K based on newly-decoding results. Preferably, counter updating is performed for a predetermined iteration, as 30 times in this embodiment. In theory, as the iteration for counter updating increases, the corresponding counters K of non-target cells tend to become smaller (because of their poor correlation), and the corresponding counter K of the target cell tends to become higher accordingly (because the expected high correlation). Nevertheless, to speed up the search, repeated receiving, decoding and comparing of one cell are stopped once the counter corresponding to the cell becomes 0. Hence, when re-calculated a subsequent time, cells whose counters are 0 are not searched again, so these counters are not updated and remain 0. For example, if the counter vector P is (0,2,2,2,0), only cells C1-C3 are to be searched and go through the receiving, decoding and comparing operations, while cells C0 and C4 experience no more searching. If the iterations have already been performed 30 times, in step S380, all operations are stopped. For example, if the counter vector P becomes (0,25, 30,22,0) after 30 iterations, the counter vector P remains and is stored in a storage device, in step S240, for further processing. It is understood that the iteration number can be adjusted according to the parameters of the environment to meet a system requirement.

Figure 4:
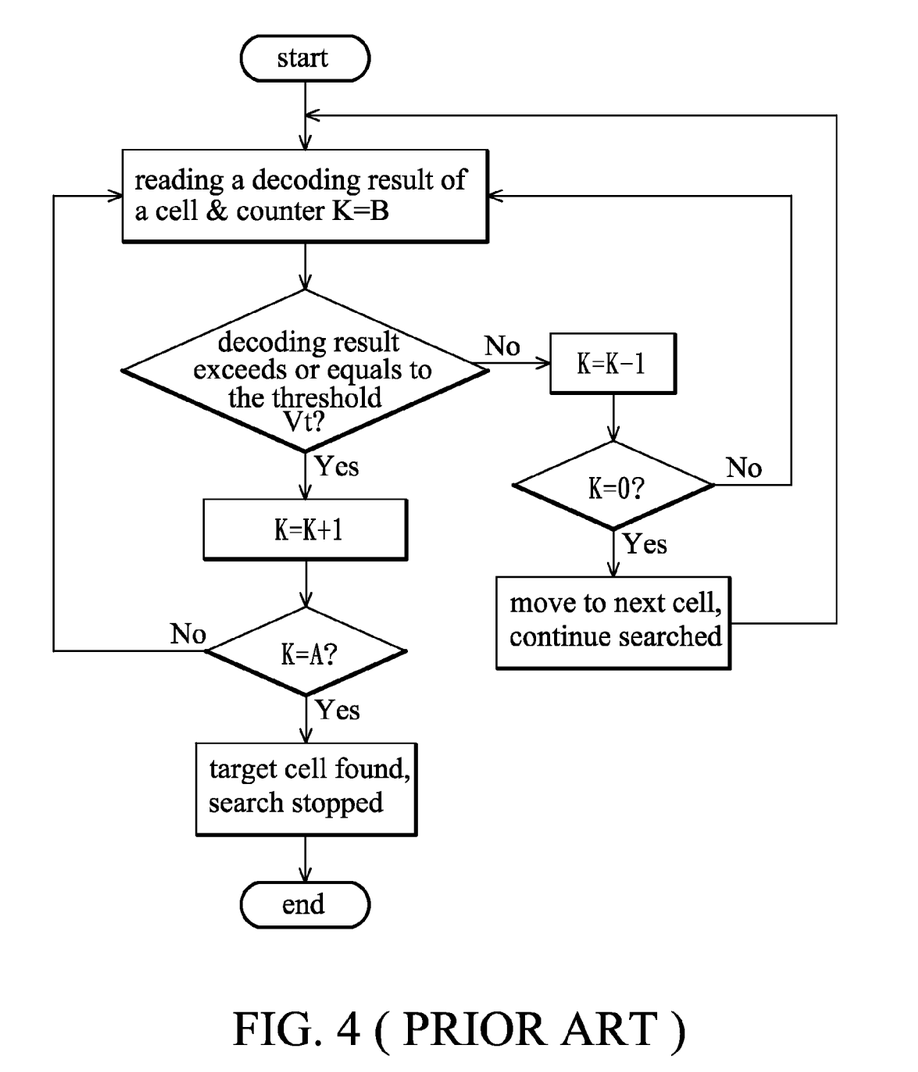
FIG. 4 is a flowchart of a conventional searching method.

FIG. 4 is a flowchart of a conventional searching method. As shown in FIG. 4, comparison and updating of the counters K are performed cell by cell, where only a single cell is searched each time. In this example, a counter K is increased if a resulting correlation matches a predetermined criteria, and the counter K is decreased if the resulting correlation does not. A target cell is found if the resulting correlation has matched the predetermined criteria several times such that the corresponding counter exceeds or equals a predetermined value A. Only if the resulting correlation fails several times such that the counter K becomes 0, the search for the current cell fails and the search for a subsequent cell takes place. Counters of certain cells adjacent to the target cell vary between 0 and A, taking a very long time for them to become 0 such that search time is inefficiently long.

Compared with the aforementioned conventional searching method, several cells can be parallel searched and compared at the same time, and the target cell located after a predetermined times of iterations have been performed according to the method of the invention. For example, as shown in FIG. 3, it is determined whether there is a target cell after at most 30 times of iterations have been performed for every cell. Therefore, the time for searching is significantly reduced such that the position and the speed of a GPS receiver are quickly found.

Figure 6:
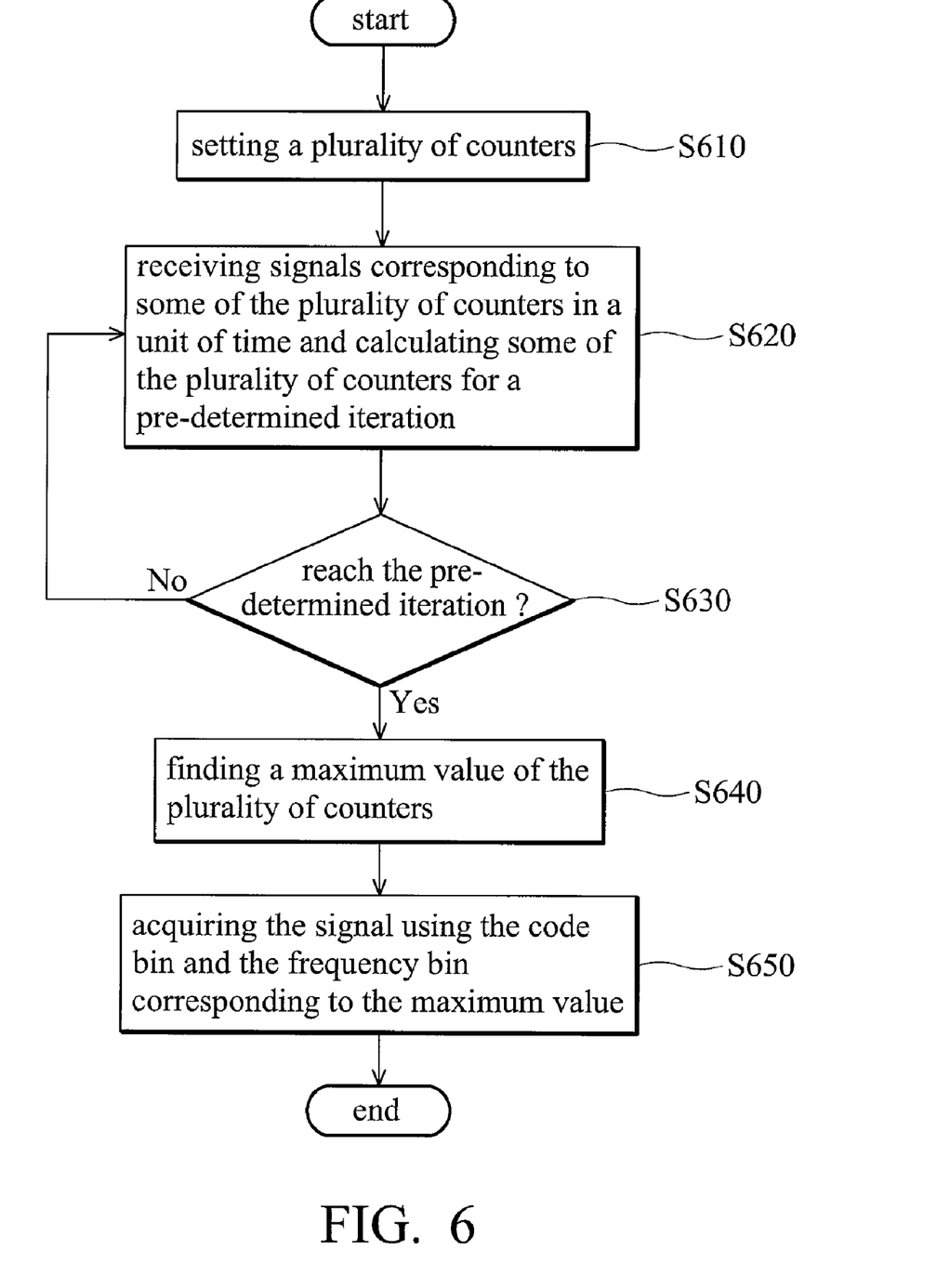
FIG. 6 is a flowchart of a GPS signal acquisition method according to an embodiment of the invention.

FIG. 6 is a flowchart of a GPS signal acquisition method according to an embodiment of the invention. In step S610, a GPS receiver first sets a plurality of counters, each corresponding to a code bin and a frequency bin of the specific code for a specific GPS satellite. The code bins and the frequency bins used herein are the same as those in FIG. 1. In step S620, the signal from a frequency bin in a unit of time is received. The counters corresponding to the counters regarding a frequency bin are updated. Subsequently, in step S630, it is determined whether a predetermined iteration number is reached. If not (No in step S630), step S620 is repeated to receive the signal from the frequency bin in another unit of time and update the corresponding counters. If so (Yes in step S630), in step S640, the counter with the maximum value is found. Finally, the location and the speed of the GPS receiver is derived according to the code bin and the frequency bin corresponding to the counter with the maximum value.

For example, if there are 10 code bins and 10 frequency bins to be searched, and the predetermined iteration number for searching is 10, first, 100 counters are set, each corresponding to a code bin and a frequency bin of the specific code for a specific GPS satellite. Subsequently, the signal corresponding to the 10 counters regarding a frequency bin in a unit of time is received and the 10 counters are updated, accordingly, based on, for example, the 10 decoding results from decoding the received signal with respect to 10 corresponding code bins and the 10 results of comparing the 10 decoding results with a threshold. It should be noted that FFT or correlation operation can be used to decode the received signal with respect to the 10 corresponding code bins. A corresponding counter is increased by one if a decoding result thereof exceeds or equals the threshold, otherwise the corresponding counter is decreased by one. Then, it is determined whether the predetermined iteration number 10 is reached. If the iteration number is not 10 yet, the signal in another unit of time from the same frequency bin is received and those 10 corresponding counters are updated again. It should be noted that the aforementioned steps of receiving and updating are repeated only when a corresponding counter exceeds a limit value. For example, in this embodiment, if the limit value is 0, those counters reaching 0 will not be updated again such that relevant procedures can be skipped. Therefore, only those counters that are not 0 are updated. If the aforementioned steps of receiving and updating have been performed 10 times and all the 100 counters have been updated, all the 100 counters are filtered to find the counter having the maximum value among the filtered 100 counters. By doing so, the corresponding code bin and frequency bin of the maximum counter can be used to determine the location and speed of the GPS receiver. The step of filtering can be performed by a FIR filter. Similar, it is understood that the threshold can be adjusted according to the parameters of the environment to meet the system requirement.

Figure 5:
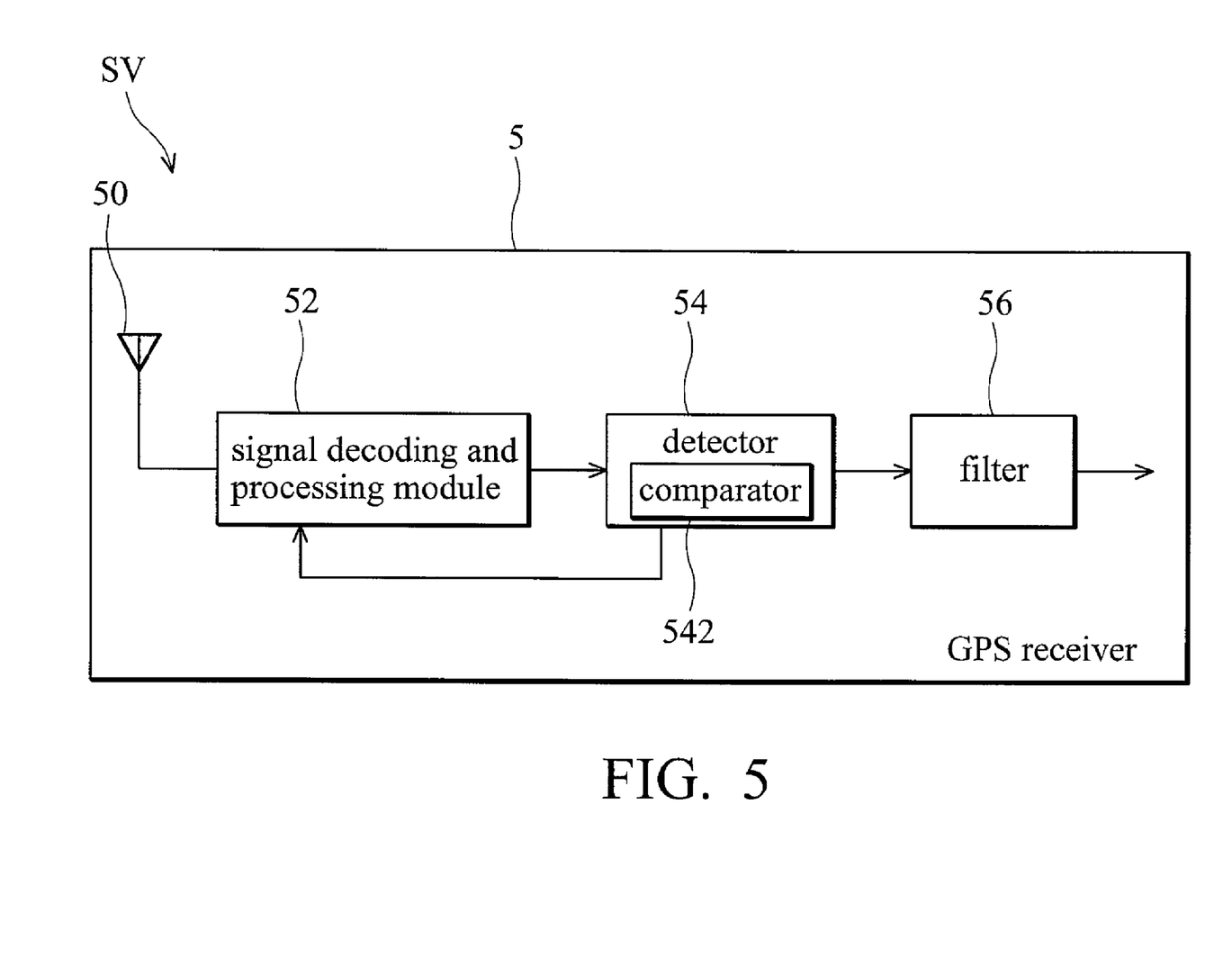
FIG. 5 is a schematic diagram of a GPS receiver according to an embodiment of the invention.

FIG. 5 shows a GPS receiver according to an embodiment of the invention. A GPS receiver 5 comprises a GPS antenna module 50, a signal decoding and processing module 52, a detector 54, and a filter 56. The GPS antenna module 50 receives the signal of a satellite in a unit of time from a detecting frequency bin. The signal decoding and processing module 52 decodes the received signal with respect to the code bins corresponding to the detecting frequency bin and generates a plurality of decoding results. These decoding results form a decoding vector. In this embodiment, the signal decoding and processing module 52 further comprises a FFT operation module performing the FFT operation or a correlator such that a correlation operation for the received signal and a corresponding code bin is performed to generate a corresponding decoding result. The decoding vector is then sent to the detector 54. Subsequently, the detector 54 compares each decoding result (i.e. correlation value) in the decoding vector with a threshold Vt, and updates counters corresponding to the cells according to comparison results. When one of the counters is not equal to a limit value, the detector 54 repeatedly receives the signal to generate a newly-decoding result, compare the newly-decoding result with a threshold Vt, and update the counter K for predetermined iteration times. The detector 54 may comprise a comparator 542 for comparing the decoding result of each cell with the threshold Vt. For example, if the limit value is 0 and the predetermine iteration is 30 times, detector 54 will repeat the steps of comparing and updating a corresponding counter for 30 times when the counter is not equal to 0. All counters will be filtered by filter 56 to find a most likely cell that has a maximum value among counters. This most likely cell is assigned to the target cell. Finally, the time delay and the frequency shift for the target cell are utilized to obtain the distance and relative speed between the GPS receiver and the satellite.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for locating a target cell among a plurality of cells corresponding to a GPS (Global Position System) signal, with the plurality of cells forming a two-dimensional array, wherein each row of the two-dimensional array corresponds to a code bin of the GPS signal and each column of the two-dimensional array corresponds to a frequency bin of the GPS signal, the method comprising:
   (1) providing a plurality of counters, each corresponding to one of the plurality of cells;
   (2) receiving the GPS signal in a unit of time in a detecting frequency bin;
   (3) decoding the received GPS signal with each of the corresponding code bins with respect to first cells corresponding to the detecting frequency bin to generate a corresponding decoding result in a decoding vector;
   (4) comparing each of the decoding results in the decoding vector with a threshold to update a corresponding counter with respect to one of the first cells in a two-dimensional counter vector;
   (5) repeatedly performing the steps (2)-(4) for a predetermined iteration if any of the corresponding counters exceeds a limit value;
   (6) determining whether the steps (2)-(4) have been performed for all of the plurality of cells;
   (7) filtering the plurality of counters to generate filtered results;
   (8) finding a most likely cell having a maximum value among the filtered results; and
   (9) setting the most likely cell to be the target cell for acquisition of the GPS signal.

2. The method as claimed in claim 1, wherein the step (4) further comprises:
   increasing one of the corresponding counters by one if the corresponding decoding result exceeds or equals to the threshold; and
   decreasing the one of the corresponding counters by one if the corresponding decoding result is less than the threshold.

3. The method as claimed in claim 1, wherein the unit of time is about 1 ms.

4. The method as claimed in claim 1, wherein the predetermined iteration is adjustable based on parameters of an environment.

5. The method as claimed in claim 1, wherein the filtering further comprises utilizing a FIR (finite impulse response) filter.

6. The method as claimed in claim 1, wherein the threshold is adjustable based on parameters of an environment.

7. The method as claimed in claim 1, wherein the decoding comprises a FFT (fast Fourier transformation) operation.

8. A GPS receiver for searching a target cell among a plurality of cells corresponding to a GPS signal, the plurality of cells forming a two-dimensional array, wherein each row of the two-dimensional array corresponds to a code bin of the GPS signal and each column of the two-dimensional array corresponds to a frequency bin of the GPS signal, a plurality of counters corresponding to the cells, the GPS receiver comprising:
   an antenna module for receiving an emitted signal of a GPS satellite;
   a signal decoding and processing module for decoding a received signal in a unit of time in a detecting frequency bin with corresponding code bins with respect to first cells corresponding to the detecting frequency bin to generate a corresponding decoding result of each of the corresponding code bins in a decoding vector;
   a detector for comparing each of the decoding results in the decoding vector with a threshold to update a corresponding counter with respect to each of the first cells in a two-dimensional counter vector; and
   a filter for filtering the plurality of counters to find a most likely cell having a maximum value among the plurality of counters and set the most likely cell as the target cell;
   wherein, if one of the corresponding counters exceeds a limit value, the signal decoding and processing module and the detector repeatedly decode, compare and update the corresponding counter for a predetermined iteration.

9. The GPS receiver as claimed in claim 8, wherein the detector comprises at least one comparator for comparing each of the decoding results with the threshold.

10. The GPS receiver as claimed in claim 8, wherein the detector increases a corresponding counter by one when the corresponding decoding result exceeds or equals to the threshold, and decreases a corresponding counter by one when the corresponding decoding result is less than the threshold.

11. The GPS receiver as claimed in claim 8, wherein the filter is a FIR filter.

12. The GPS receiver as claimed in claim 8, wherein the signal decoding and processing module comprises a module for performing FFT operation.

* * * * *